Patented Aug. 3, 1954

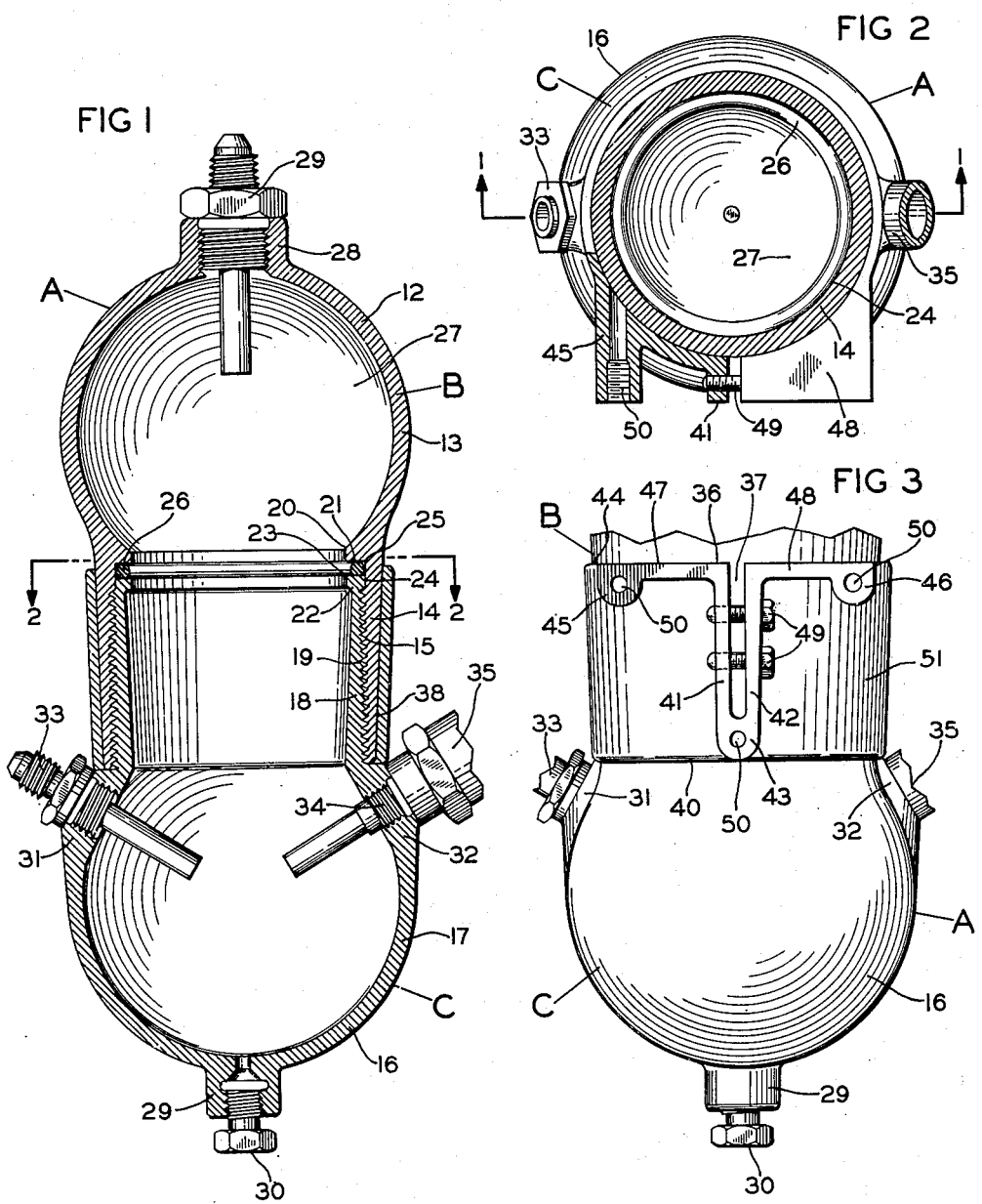

2,685,382

UNITED STATES PATENT OFFICE 2,685,382

TANK

Nelson F. Cornelius, Anoka, Minn., assignor to The Cornelius Company, Minneapolis, Minn., a corporation of Minnesota Application December 24, 1949, Serial No. 134,921

3 Claims. (Cl. 220—3)

1

The herein disclosed invention relates to gas tanks and has for an object to provide a tank for use on airplanes and capable of withstanding pressures up to 3000 lbs. per square inch.

Another object of the invention resides in providing a tank having a minimum weight for its capacity.

An object of the invention resides in providing a tank which may be readily fabricated.

A still further object of the invention resides in constructing the tank in sections each having a container globular in form and a neck formed thereon and in connecting the sections together through said necks.

Another object of the invention resides in forming one of said necks smaller in diameter than the other and in providing the smaller neck with external threads and the larger neck with internal threads and in screwing the necks together and in further providing within the interior of the tank a seal for preventing leakage between the sections.

An object of the invention resides in supporting the tank through the outermost neck.

Another object of the invention resides in providing a bracket for supporting the tank, said bracket having a collar encircling the outermost neck and clamped thereto.

A feature of the invention resides in providing bosses on said containers disposed adacent said necks and to which fittings for connecting the tank to the apparatus with which it is to be used may be attached.

Other objects of the invention reside in the novel combination and arrangement of parts and in the details of construction hereinafter illustrated and/or described.

In the drawings has been illustrated a tank constructed in two sections each having a globular shaped container and a neck formed thereon. The necks are of smaller dimensions than the containers and of different diameters, the smaller neck being formed with external threads and the larger neck with internal threads. The two sections are adapted to be attached to one another by screwing the necks together. A seal within the tank situated at the end of the innermost neck prevents leakage through the threads and between the necks. For supporting the tank a bracket is employed which has a collar encircling the outer neck. Clamping means on this collar holds the same securely attached to the outermost neck. Both sections of the tank have bosses situated at the ends of the container thereof while one section has bosses situated near the neck thereof. These bosses are threaded to receive fittings for connecting inlet and outlet conduits to the tank and for connecting valves or other apparatus to the tank.

In the drawings:

Fig. 1 is an elevational sectional view of a tank embodying the invention and taken on line 1—1 of Fig. 2.

2

Fig. 2 is a plan sectional view taken on line 2—2 of Fig. 1 with a portion of the supporting bracket shown in section.

Fig. 3 is a fragmentary elevational view of the invention.

In airplanes, floor space is at a premium and heavy equipment requiring considerable space is exceedingly objectionable. The instant invention provides a tank which may be mounted on a wall or similar support and up from the floor and which can be constructed to withstand exceedingly great pressures and which is exceedingly light for its capacity.

The invention consists of a tank A which is constructed in two sections B and C both similar in construction. The section B consists of a globular or spheroidal shaped container 12 having a spherical wall 13 of uniform thickness throughout the major portion of its extent. The said wall has issuing from it a neck 14 tubular in form and which is of smaller diameter than the container 12. This neck has internal threads 15. The section C is similarly constructed with a container 16 of the same size and shape as the container 12 and which has a spherical wall 17. This container is formed with a tubular neck 18 which issues outwardly from the wall 17 and which is of smaller diameter than the diameter of the neck 14. This neck is constructed with external threads 19 which are adapted to screw into the threads 15. Both the necks 14 and 18 are tapered toward the outer ends of the same to reduce the weight of the tank. The wall 13 of container B continues inwardly past the neck 14 to form a flange 20 having an outwardly facing shoulder 21. The end of the neck 18 has formed on it a flange 22 which has a shoulder 23. The neck 14 is formed with a bore 24 disposed inwardly of the threads 15 and which in conjunction with the shoulders 21 and 23 forms a groove 25 at the end of the neck 18. In this groove is disposed a sealing ring 26 preferably constructed of rubber, which seats snugly against the bore 24 and against one or both of the shoulders 21 and 23. When pressure is created within the interior chamber 27 of the tank A, the ring 22 is forced against the shoulder 23 and against the bore 24 and a tight joint is effected between the sections B and C.

The container 12 of section B has formed at the upper end of the wall 13 thereof a boss 28 which is threaded to receive a fitting 29. This fitting serves to connect the outlet tube used with the tank to the same and which has not been shown in the drawing. The corresponding end of the wall 17 of container 16 of section C is constructed with a boss 29 which is threaded to receive a plug 30. The passageway through this boss serves as a drain for draining out any liquid which may collect in the chamber 27 and is adapted to be closed by the plug 30. In the wall 17 of container 16 and near the neck 18 are formed two bosses 31 and 32. These bosses are threaded to receive a fitting 33 and the stem 34 of a relief valve 35. The said valve forming no particular feature of the invention has not been illustrated in detail in this application. The bosses 31 and 32 are situated near the neck 18 where the fitting and valve may be directed into the chamber 27 and above the bottom thereof. The fitting 33 is adapted to be connected to the inlet tube used with the tank.

For supporting the tank A a bracket 36 is employed. This bracket comprises a collar 51 which is tubular in form and which has a tapered bore 38 adapted to receive the outermost neck 14. This collar is formed with a slit 37 running longitudinally thereof but terminating short of the lower end 40 of said collar. Adjacent the slit 37 and on the sides thereof are provided two flanges 41 and 42 which are joined near the lower edge 40 of the collar to form a boss 43. Near the upper end 44 of the collar 37 and spaced from the slit 37 are formed posts 45 and 46 which extend out to the surface of the boss 43. Flanges 47 and 48 integral with the collar 51, the posts 45 and 46 and the flanges 41 and 42 tie the various parts together. A number of cap screws 49 extend through the flange 42 and are screwed into the flange 41. These cap screws serve to draw the parts of the collar adjacent the split 37 together and to securely clamp the bracket on the neck 14. The ends of the posts 45 and 46 and the boss 43 are formed with tapped holes 50 into which attaching screws, not shown in the drawings, for mounting the tank in position may be screwed.

By means of bracket 36 the tank A can be mounted in an upright position and attached to a wall instead of being disposed on the floor thereby utilizing a minimum amount of space and space otherwise ordinarily not so much at a premium in an airplane. By constructing the tank with the two globular containers great strength is procured and maximum capacity for the weight employed.

The advantages of the invention are manifest. The tank has its greatest dimension in an up and down direction thereby minimizing in the horizontal space occupied by the same. The tank may be attached to a wall and installed in a vertical position. The connection between the containers serves as a means on which the attaching bracket may be mounted. The tank when installed is rigidly secured in position. With the invention disclosed the tank can be made to withstand extremely high pressures up to 3000 lbs. per square inch.

Changes in the specific form of the invention, as herein described, may be made within the scope of what is claimed without departing from the spirit of the invention.

Having described the invention, what is claimed as new and desired to be protected by Letters Patent is:

1. A tank comprising two sections each having a globular container and a neck issuing therefrom, one of said necks being of lesser diameter than the other, said necks being threaded and screwed together, a bracket for supporting said tank including a collar encircling the larger of said necks and extending down to the end of said larger neck and a boss formed on the section having the smaller of said necks at the locality of the smaller neck and extending outwardly to the outer surface of said collar, said boss having a threaded hole therein.

2. A bracket for supporting a tank having a neck, said bracket having an elongated collar adapted to encircle said neck and supporting the tank for rotation therein, said collar having a longitudinally extending slit therein open throughout the major portion of the length of the collar and through one end thereof and closed at the other end of said collar, a longitudinally extending flange on said collar on each side of said slit, a screw intermediate the ends of said collar and engaging said flanges for drawing the parts of the collar adjacent said slit together to clamp the collar on said neck, said flanges being joined together and to the collar at the closed end of the slit to form a boss extending in a radial direction with respect to said collar, posts issuing outwardly from said collar at the end thereof through which said slit opens, said posts being disposed one on each side of said slit and spaced from said slit and from one another, said posts being parallel to said boss and transversely extending flanges at the same end of said collar as said posts and free of the intermediate portion of the collar, each of said flanges connecting one of said first named flanges to the post on the same side of the slit, said boss and posts being formed with parallel threaded holes to receive attaching screws.

3. A bracket for supporting a tank having a neck, said bracket having an elongated collar adapted to encircle said neck and supporting the tank for rotation therein, said collar having a longitudinally extending slit therein open throughout the major portion of the length of the collar and through one end thereof and closed at the other end of said collar, a longitudinally extending flange on said collar on each side of said slit, a screw intermediate the ends of said collar and engaging said flanges for drawing the parts of the collar adjacent said slit together to clamp the collar on said neck, said flanges being joined together and to the collar at the closed end of the slit to form a boss extending in a radial direction with respect to said collar, posts issuing outwardly from said collar at the end thereof through which said slit opens, said posts being disposed one on each side of said slit and spaced from said slit and from one another, said posts being parallel to said boss and transversely extending flanges at the same end of said collar as said posts and free of the intermediate portion of the collar, each of said flanges connecting one of said first named flanges to the post on the same side of the slit, said collar, flanges, posts and boss being integral and attaching means engageable with said posts and boss.

References Cited in the file of this patent

UNITED STATES PATENTS

| Number | Name | Date |
|---|---|---|
| 441,661 | Hawley | Dec. 2, 1890 |
| 693,398 | Ill | Feb. 18, 1902 |
| 901,049 | Tutor | Oct. 13, 1908 |
| 1,563,243 | Von Gorden | Nov. 24, 1925 |
| 1,575,949 | Thorn | Mar. 6, 1926 |
| 1,760,458 | Weber | May 27, 1930 |
| 1,803,194 | Kennedy | Apr. 28, 1931 |
| 2,294,858 | Allen | Sept. 1, 1942 |
| 2,507,783 | Graham | May 16, 1950 |

FOREIGN PATENTS

| Number | Country | Date |
|---|---|---|
| 332,861 | Italy | Dec. 10, 1935 |
| 496,477 | Great Britain | Nov. 30, 1938 |
| 115,712 | Australia | Aug. 12, 1942 |